(12) United States Patent
Kumph et al.

(10) Patent No.: US 11,972,319 B2
(45) Date of Patent: Apr. 30, 2024

(54) MULTIMODE RESONATORS FOR RESONATOR INDUCED PHASE GATES

(71) Applicant: International Business Machines Corporation, Armonk, NY (US)

(72) Inventors: Muir Kumph, Croton on Hudson, NY (US); David C. Mckay, Ossining, NY (US); Oliver Dial, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 790 days.

(21) Appl. No.: 17/111,053

(22) Filed: Dec. 3, 2020

(65) Prior Publication Data
US 2022/0180235 A1    Jun. 9, 2022

(51) Int. Cl.
*G06N 10/00* (2022.01)
*G06N 10/40* (2022.01)

(52) U.S. Cl.
CPC ............. *G06N 10/00* (2019.01); *G06N 10/40* (2022.01)

(58) Field of Classification Search
CPC ..................................... G06N 10/40
See application file for complete search history.

(56) References Cited

U.S. PATENT DOCUMENTS

| | | | |
|---|---|---|---|
| 6,900,454 B2 | 5/2005 | Blais et al. | |
| 10,346,761 B2 | 7/2019 | Clarke et al. | |
| 10,404,214 B2 | 9/2019 | Szocs et al. | |
| 2017/0062692 A1* | 3/2017 | Dial | H10N 60/01 |
| 2017/0091647 A1 | 3/2017 | Abdo | |
| 2018/0054165 A1 | 2/2018 | Szocs et al. | |
| 2019/0043919 A1* | 2/2019 | George | G06N 10/00 |
| 2019/0044044 A1 | 2/2019 | Lampert et al. | |
| 2019/0164059 A1 | 5/2019 | Denchev et al. | |
| 2019/0273197 A1 | 9/2019 | Roberts et al. | |
| 2020/0321508 A1 | 10/2020 | Hart et al. | |

FOREIGN PATENT DOCUMENTS

| | | |
|---|---|---|
| WO | 2017/055942 A1 | 4/2017 |
| WO | 2017152287 A1 | 9/2017 |
| WO | 2018/182584 A1 | 10/2018 |

OTHER PUBLICATIONS

Ranzani, Leonardo, et al. "Kinetic inductance traveling-wave amplifiers for multiplexed qubit readout." Applied Physics Letters 113.24 (2018). (Year: 2018).*

(Continued)

*Primary Examiner* — Eric Nilsson
(74) *Attorney, Agent, or Firm* — Amin, Turocy & Watson, LLP

(57) ABSTRACT

Techniques regarding qubit coupling structures that enable RIP gates are provided. For example, one or more embodiments described herein can comprise an apparatus that can include a coupling structure coupled to a first qubit and a second qubit. The coupling structure can have a plurality of coupling pathways. A coupling pathway from the plurality of coupling pathways can be a resonator. Also, the first qubit can be coupled to a first end of the resonator, and the second qubit can be coupled to a point along a length of the resonator.

25 Claims, 11 Drawing Sheets

(56) References Cited

OTHER PUBLICATIONS

Examination Report No. 1 for Standard Patent Application for Australian Application Serial No. 2021391843 dated Aug. 9, 2023.
Magesan et al. "Effective Hamiltonian models of the cross-resonance gate" arXiv:1804.04073v2 [quant-ph] Feb. 25, 2019, 16 pages.
Paik et al. "Experimental demonstration of a resonator-induced phase gate in a multi-qubit circuit QED system" arXiv:1606.00685v1 [quant-ph] Jun. 2, 2016, 13 pages.
Cross et al. "Optimized pulse shapes for a resonator-induced phase gate" arXiv:1411.5436v2 [quant-ph] Apr. 6, 2015, 13 pages.
McKay et al. "High contrast qubit interactions using multimode cavity QED" 10.1103/PhysRevLett.114.080501, Phys. Rev. Lett. 114, 080501 (2015), 6 pages.
Mundada et al. "Suppression of Qubit Crosstalk in a Tunable Coupling Superconducting Circuit" Phys. Rev. Applied 12, 054023 (2019), arXiv:1810.04182v2 [quant-ph] May 31, 2019, 11 pages.
Yan et al. "A tunable coupling scheme for implementing high-fidelity two-qubit gates" Phys. Rev. Applied 10, 054062 (2018), arXiv:1803.09813v1 [quant-ph] Mar. 26, 2018, 10 pages.
International Search Report and Written Opinion received for PCT Application Serial No. PCT/EP2021/083835 dated Mar. 29, 2022, 12 pages.
Response to the communication pursuant to R 161 (1) and R 162 EPC received for European Patent Application Serial No. 21823872.3 dated Jan. 10, 2024, 4 pages.

\* cited by examiner

MULTIMODE RESONATORS FOR RESONATOR INDUCED PHASE GATES

BACKGROUND

The subject disclosure relates to multimode resonators for enabling a resonator induced phase ("RIP") gate, and more specifically, a qubit coupling structure that includes multiple coupling pathways that can collectively suppress a qubit coupling interaction while a RIP gate is not in operation.

Qubits are coupled within quantum computers to implement various quantum processing operations. Conventionally, qubits are respectively coupled to a common resonator bus, where the frequency of the qubits is far detuned from the frequency of the bus. For example, two coupled qubits can be capacitively coupled to respective ends of a length of co-planar waveguide. Thereby, an all-microwave gate regarding the coupled qubits can be formed. For example, the co-planar waveguide can create an interaction between the qubits, where the frequency of each qubit can depend on the state of the other and exciting the waveguide with a microwave tone can change the degree of frequency change.

Where the qubits are fixed-frequency superconducting qubits (e.g., transmons), a RIP gate can be formed by applying an off-resonant tone to the resonator bus. A signal in the resonator and, therefore, the Stark shift the qubit experience will depend on a joint state of the qubits. To achieve an appreciable RIP entangling rate, a qubit coupling structure that enables a large qubit frequency shift is desired. However, with conventional coupling structures, increasing the amount of qubit frequency shift enabled for the RIP gate also increases an undesirable amount of quantum entanglement between the qubits while the RIP is not active.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, apparatuses, devices, and/or systems regarding qubit coupling structures that can enable one or more RIP gates are described.

According to an embodiment, an apparatus is provided. The apparatus can comprise a coupling structure coupled to a first qubit and a second qubit. The coupling structure can have a plurality of coupling pathways. Additionally, a coupling pathway from the plurality of coupling pathways is can be a resonator. The first qubit can be coupled to a first end of the resonator, and the second qubit can be coupled to a point along a length of the resonator. An advantage of such an apparatus can be that a difference between a zero qubit-qubit coupling frequency and a resonance frequency can be controlled based on the second qubit's positioning along the resonator length.

In some examples, the coupling pathway can establish a resonator induced phase gate between the first qubit and the second qubit. Thereby, the coupling structure can advantageously serve as a RIP quantum logic gate.

According to an embodiment, an apparatus is provided. The apparatus can comprise a coupling structure coupled to a first qubit and a second qubit. The coupling structure can have a plurality of coupling pathways. A coupling pathway from the plurality of coupling pathways can be a resonator with a transmission line shunt. An advantage of such an apparatus can be that the resonator can exhibit multiple resonance modes.

In some examples, the plurality of coupling pathways can collectively suppress a coupling interaction between the first qubit and the second qubit. An advantage of such an apparatus can be a reduction in undesirable quantum entanglement between the first and second qubits.

According to an embodiment, an apparatus is provided. The apparatus can comprise a quarter wavelength superconducting waveguide capacitively coupled to a first qubit and a second qubit. The quarter wavelength superconducting waveguide can have multiple impedances. An advantage of such an apparatus can be the formation of a multimode resonator coupled to the first and second qubits.

In some examples, the apparatus can further comprise a resonator induced phase gate that can drive the quarter wavelength superconducting waveguide at a first resonator mode from the plurality of resonator modes. Thereby, the resonator-induced phase gate can promote the coupling interaction between the first qubit and the second qubit. An advantage of such an apparatus can be that qubit-qubit coupling when the RIP gate is not operating can be suppressed.

According to an embodiment, an apparatus is provided. The apparatus can comprise a quarter wavelength superconducting waveguide capacitively coupled to a first qubit and a second qubit. The quarter wavelength superconducting waveguide can have multiple impedances. Additionally, the apparatus can comprise a half wavelength superconducting waveguide capacitively coupled to the first qubit and the second qubit. An advantage of such an apparatus can be a coupling structure that can enable a RIP gate for high qubit fidelities.

In some examples, the apparatus can further comprise a superconducting ground connection that can be coupled to, and electrically ground, the quarter wavelength superconducting waveguide. An advantage of such an apparatus can be the enablement of multiple, interfering resonance modes.

According to an embodiment, an apparatus is provided. The apparatus can comprise a quarter wavelength superconducting waveguide capacitively coupled to a first qubit and a second qubit. The quarter wavelength superconducting waveguide can have multiple impedances. Additionally, the apparatus can comprise a direct capacitive coupling between the first qubit and the second qubit. An advantage of such an apparatus can be multiple coupling pathways between the first and second qubits.

In some examples, the quarter wavelength superconducting waveguide can have a first segment between the first qubit and a capacitor, and a second segment between the capacitor and the second qubit. Also, the apparatus can further comprise a superconducting ground connection that can be coupled to, and electrically ground, the first segment. An advantage of such an apparatus, can be a multimode resonator that can enable a RIP gate, where the even and odd resonance modes can exhibit different shapes.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of qubit coupling structures for RIP gates, the present disclosure can be implemented to produce a solution to one or more of these problems by a degenerate multimode resonator for enabling a RIP gate. Various embodiments described herein can regard qubit coupling structures that exhibit multiple resonant modes. Collectively, the multiple resonant modes can interfere with each other to suppress a qubit-qubit coupling interaction. Additionally, the coupling structure can enable a RIP gate via energization of one of the resonant modes to promote the qubit-qubit coupling interaction. Advantageously, quantum entanglement between the qubits can be inhibited when the RIP gate is not in operation.

In one or more embodiments, the qubit-qubit coupling cancellation can be achieved based on the qubits' respective electrical distance along a resonator bus. In various embodiments, the qubit coupling structure can comprise a plurality of coupling pathways, where one of the pathways is a resonator with a transmission line shunt. In some embodiments, one of the coupling pathways can include a quarter wavelength superconducting wave guide, having multiple impedances, capacitively coupled to a first and second qubit. Additionally, a coupling pathway of the qubit coupling structure can include a half wavelength superconducting waveguide capacitively coupled to the qubits. In one or more embodiments, the coupling structure can further include a direct capacitive coupling between the qubits. For instance, a coupling pathway of the qubit coupling structure can include a first segment between a first capacitively coupled qubit and a capacitor, and a second segment between the capacitor and a second capacitively coupled qubit. Additionally, the first and/or second segments can be coupled to a superconducting ground connection. Thereby, a short coupling stub can be established to cause even and odd modes of the resonator to have different shapes, thereby establishing a zero entangling rate at the qubit frequency.

Figure 1:
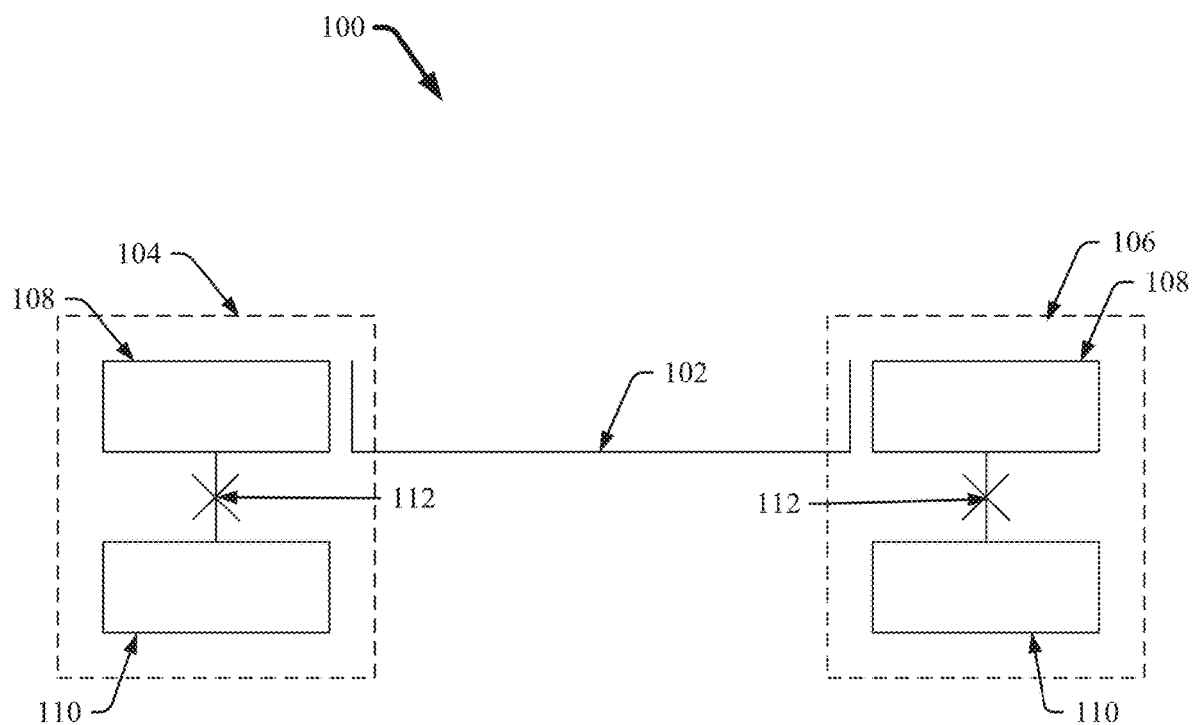
FIG. 1 illustrates a diagram of an example, non-limiting first resonator bus topology for enabling a RIP gate between a first qubit and a second qubit in accordance with one or more embodiments described herein.

FIG. 1 illustrates a diagram of an example, non-limiting first topology of a qubit coupling structure 100 in accordance with one or more embodiments described herein. Repetitive description of like elements employed in other embodiments described herein is omitted for sake of brevity. As shown in FIG. 1, the qubit coupling structure 100 can include a resonator bus 102 coupled to a first qubit 104 and a second qubit 106. In various embodiments, the qubit coupling structure 100 can enable one or more RIP gates with regards to the first qubit 104 and the second qubit 106.

In one or more embodiments, the first qubit 104 and/or the second qubit 106 can be fixed frequency superconducting qubits, such as transmon qubits. For example, the first qubit 104 and/or the second qubit 106 can comprise a first capacitive pad 108, a second capacitive pad 110, and/or one or more Josephson junctions 112. The first capacitive pads 108 and/or the second capacitive pads 110 can be comprised from one or more superconducting metals. As used herein, the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconducting materials (e.g., hydride superconductors, such as lithium/magnesium hydride alloys) can be used in the various embodiments described herein. Example materials that can be comprised within the first capacitive pads 108 and/or the second capacitive pads 110 can include, but are not limited to: aluminum, niobium, tantalum, a combination thereof, and/or the like.

As shown in FIG. 1, one or more Josephson junctions 112 can be located between the first capacitive pad 108 and the second capacitive pad 110 of the respective qubit (e.g., of first qubit 104 and/or second qubit 106). The one or more Josephson junctions 112 can establish a weak link between the superconducting materials via, for example: an insulator material, a normal (e.g., non-superconducting) metal material, a combination thereof, and/or the like. In various embodiments, the one or more Josephson junctions 112 can be characterized by: a superconductor-insulator-superconductor ("SIS") structure, a superconductor-normal metal-superconductor ("SNS") structure, and/or a superconductor-constriction-superconductor ("SCS") structure.

In various embodiments, the resonator bus 102 can be a superconducting transmission line, such as a length of co-planar waveguide. Example materials that can be comprised within the resonator bus 102 can include, but are not limited to: aluminum, niobium, tantalum, a combination thereof, and/or the like. In one or more embodiments, the resonator bus 102 can be capacitively or inductively coupled to the first qubit 104 and/or the second qubit 106. For example, the resonator bus 102 can be capacitively coupled to the first capacitive pad 108 of the first qubit 104 and capacitively coupled to the first capacitive pad 108 of the second qubit 106 (e.g., as shown in the first example topology shown in FIG. 1).

In one or more embodiments, the frequency of the first qubit 104 and/or the second qubit 106 can be far detuned from the frequency of the resonator bus 102. For example, the coupling structure 100 can be characterized by Equation 1 below.

$$H = \Sigma_{i=0} \omega_i n_i + g_i(a_i + a_i^\dagger)(b_0 + b_0^\dagger) + \omega_{BUS} b_i^\dagger b_i \quad (1)$$

Where "$g_i(a_i+a_i^\dagger)(b_0+b_0^\dagger)$" can be the qubit-bus coupling for each respective qubit (e.g., "i=0" with regards to the first qubit 104, and "i=1" with regards to the second qubit 106), "$g_i$" can be the coupling strength of the $i^{th}$ qubit to the bus resonator mode, "$\omega_i$" can be the angular frequency of the $i^{th}$ qubit, "$n_i$" can be the number operator for the $i^{th}$ qubit, and "$\omega_{BUS}$" can be the angular frequency of the resonator bus 102.

In various embodiments, the resonator bus 102 can be passive. For example, the resonator bus 102 can lack photons and can serve as an effective qubit-qubit exchange coupling "J", as characterized by Equation 2 below.

$$J = \frac{g_0 g_1}{2} \left( \frac{1}{\omega_0 - \omega_{BUS}} + \frac{1}{\omega_1 - \omega_{BUS}} \right) \quad (2)$$

Thereby, the resonator bus 102 can enable an all-microwave gate to be performed with regards to the first qubit 104 and the second qubit 106. For example, the qubit coupling structure 100 can enable a RIP gate with regards to the first qubit 104 and the second qubit 106. For instance, a RIP gate enabled by the qubit coupling structure 100 can be a form of a quantum logic gate coupling the superconducting first qubit 104 and second qubit 106. The RIP gate can be an all-microwave multi-qubit entanglement gate that can enable a high degree of flexibility in qubit frequencies. By adiabatically applying and removing an off-resonate pulse to the resonator bus 102, the qubit coupling structure 100 can undergo a closed loop in phase space, after which the resonator bus 102 can be left unchanged while the first qubit 104 and/or second qubit 106 acquire a state-dependent phase.

However, the qubit-qubit coupling "J" also establish an entanglement of the first qubit 104 and the second qubit 106 while the RIP gate is not operating, such as a ZZ interaction. For example, the ZZ interaction can be characterized by Equation 3 below.

$$ZZ = 2J^2 \left( \frac{1}{\omega_0 - \omega_1 + \alpha_0} + \frac{1}{\omega_1 - \omega_0 + \alpha_1} \right) \quad (3)$$

Where "$\alpha$" can be the anharmonicity of the respective first qubit 104 and/or second qubit 106.

The frequency of the resonator bus 102 can depend on the state of the first qubit 104 and/or the second qubit 106, and the shift of the resonator bus 102 frequency with the qubits in the excited state can characterized in Equation 4 below by "$\chi$".

$$\chi_i = \frac{2g_i^2 \alpha_i}{\Delta_i(\Delta_i + \alpha_i)} \quad (4)$$

If the first qubit 104 and the second qubit 106 are in the excited state, the frequency of the resonator bus 102 can shift by the sum of the $\chi$'s. Further, when a tone is applied to the resonator bus 102 (e.g., detuned from the resonator bus 102), then the signal in the resonator bus 102, and therefore, the Stark shift the first qubit 104 and second qubit 106 experience can depend on the joint state of the qubits. Thereby, a relationship between the $\chi$ value and the ZZ value can be characterized by Equation 5 below.

$$ZZ \approx \chi \frac{\chi}{\alpha} \left( \frac{\alpha + \Delta}{\alpha} \right)^2 \quad (5)$$

In conventional coupling structures, increasing the $\chi$ value to achieve an appreciable RIP gate can result in an undesirable ZZ value. For example, in a conventional coupling structure applying an $\alpha$ value of −300 megahertz (MHz) with a $\Delta$ value of 1000 MHz can achieve a $\chi$ value of 10 MHz with a static ZZ value of 2 MHz, where the 10 MHz $\chi$ value can be desirable but the qubit-qubit entanglement characterized by the 2 MHz ZZ value can render the device inoperable. In various embodiments described herein, the qubit coupling structure 100 can enable a large $\chi$ value to achieve an appreciable RIP gate, while minimizing the ZZ value to suppress qubit-qubit entanglement when the RIP gate is not operating.

For example, the first example topology (e.g., shown in FIG. 1) of the qubit coupling structure 100 can control the ZZ interaction based on the electrical distance of the first qubit 104 and/or second qubit 106 along the length of the resonator bus 102. For instance, the resonator bus 102 can be a length of half wavelength superconducting co-planar waveguide ("a $\lambda/2$ resonator"), where there can be zero qubit-qubit coupling across the resonator bus 102 at ½ the resonance frequency of the resonator bus 102. Setting the first qubit 104 and the second qubit 106 to the ½ frequency can thereby couple the first qubit 104 and the second qubit 106 to the resonator bus 102 but not each other. However, setting the first qubit 104 and the second qubit 106 to the ½ frequency can also inhibit coupling between the respective qubits and the resonator bus 102 because the respective qubits are far detuned from the resonance of the resonator bus 102.

In one or more embodiments, the qubit coupling structure 100 exemplified in the first topology can achieve the zero qubit-qubit entanglement during non-gate operation by adjusting the resonance frequency. For example, the electrical distance of the respective qubits along the length of resonator bus 102 (e.g., $\lambda/2$ resonator) can control the difference between the zero qubit-qubit coupling frequency and the resonance frequency. Thereby, by adjusting the positioning of the first qubit 104 and/or the second qubit 106 along the resonator bus 102 (e.g., λ/2 resonator), the zero qubit-qubit coupling frequency can be brought closer to the resonance of the resonator bus 102. For example, additional transmission line length can be added with respect to the first qubit's 104 position along the resonator bus 102 as compared to the second qubit's 106 position along the resonator bus 102.

Figure 2:
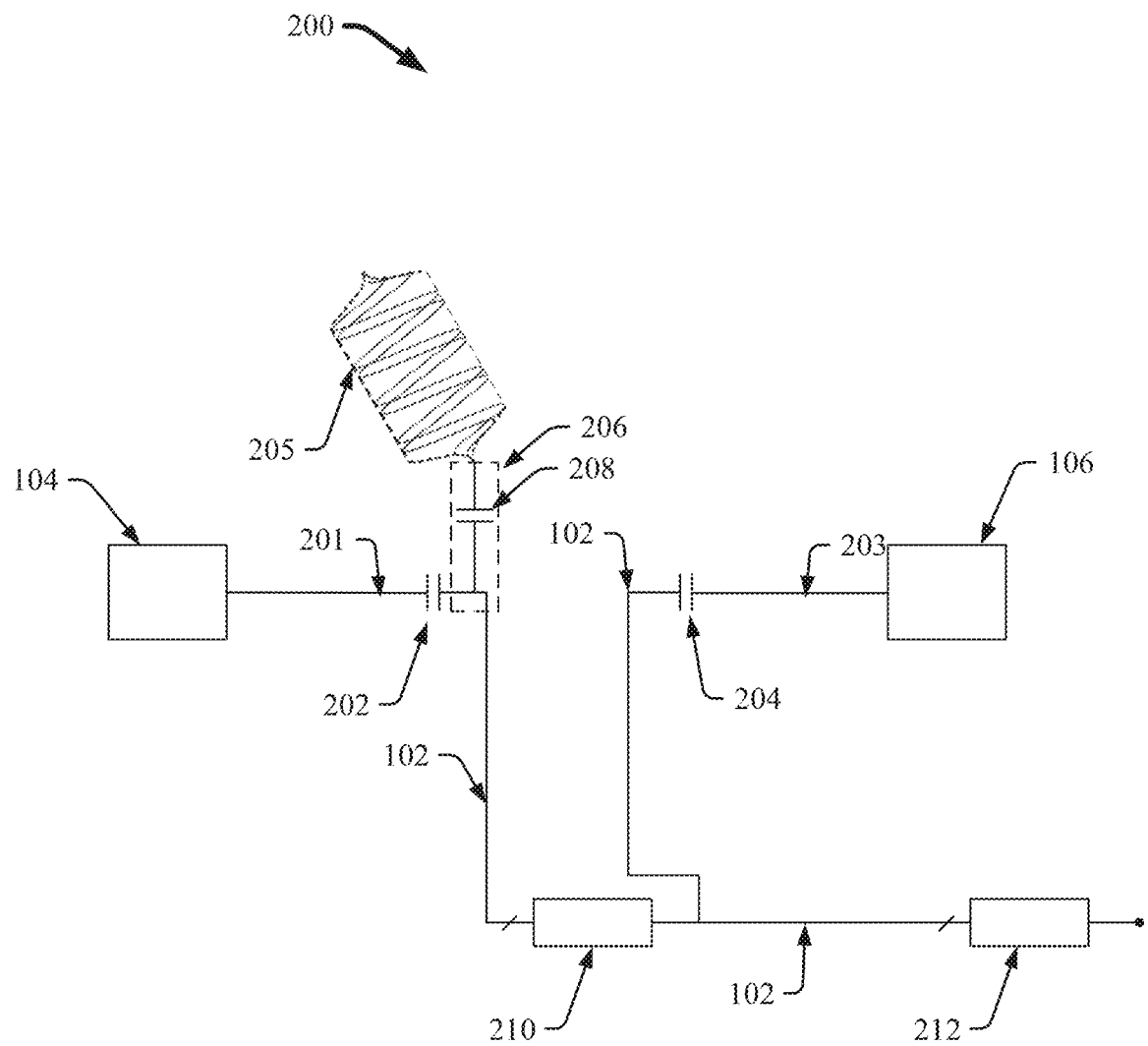
FIG. 2 illustrates a diagram of an example, non-limiting first microwave circuit that can exemplify the first resonator bus topology in accordance with one or more embodiments described herein.

FIG. 2 illustrates a diagram of an example, non-limiting first microwave circuit 200 that can exemplify the first topology shown in FIG. 1 of the qubit coupling structure 100 in accordance with one or more embodiments described herein. Repetitive description of like elements employed in other embodiments described herein is omitted for sake of brevity. As shown in FIG. 2, the first qubit 104 can be coupled to the resonator bus 102 (e.g., a λ/2 resonator) via a first coupling line 201 (e.g., a superconducting transmission line composed of one or more superconducting materials such as aluminum, niobium, and/or tantalum) and/or a first capacitor 202. Also, the second qubit 106 can be coupled to the resonator bus 102 (e.g., a λ/2 resonator) via a second coupling line 203 (e.g., a superconducting transmission line composed of one or more superconducting materials such as aluminum, niobium, and/or tantalum) and/or a second capacitor 204. Additionally, the first microwave circuit 200 can include a driving port 206 capacitively coupled to the resonator bus 102 to drive the RIP gate. For example, photons 205 (e.g., represented by wavelengths in FIG. 2) can be added and/or removed from the resonator bus 102 via the driving port 206. In various embodiments, the driving port 206 can be comprised of the same superconducting material as the resonator bus 102 and can include a third capacitor 208.

Additionally, the resonator bus 102 can comprise a first ideal transmission line element 210 (e.g., a delay-defined ideal transmission line "TLIND") and/or a second ideal transmission line element 212 (e.g., a TLIND). As shown in FIG. 2, the first qubit 104 can have a greater electrical length along the resonator bus 102 than the second qubit 106 at least due to the incorporation of the first TLIND 210. Further, as described above, the difference between the zero qubit-qubit coupling frequency and the qubit-resonator bus coupling frequency of the exemplary first microwave circuit 200 can be based on the additional electrical length associated with the first qubit 104.

Figure 3A:
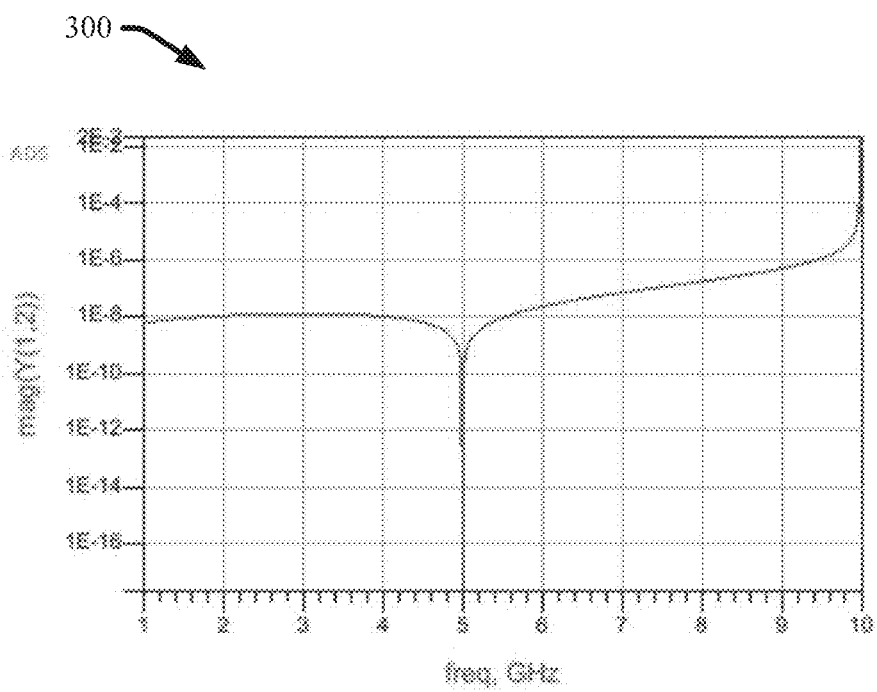
FIGS. 3A-3B illustrates diagrams, of example, non-limiting graphs that can depict a change in qubit-qubit coupling that can be achieved by the first microwave circuit in accordance with one or more embodiments described herein.
Figure 3B:
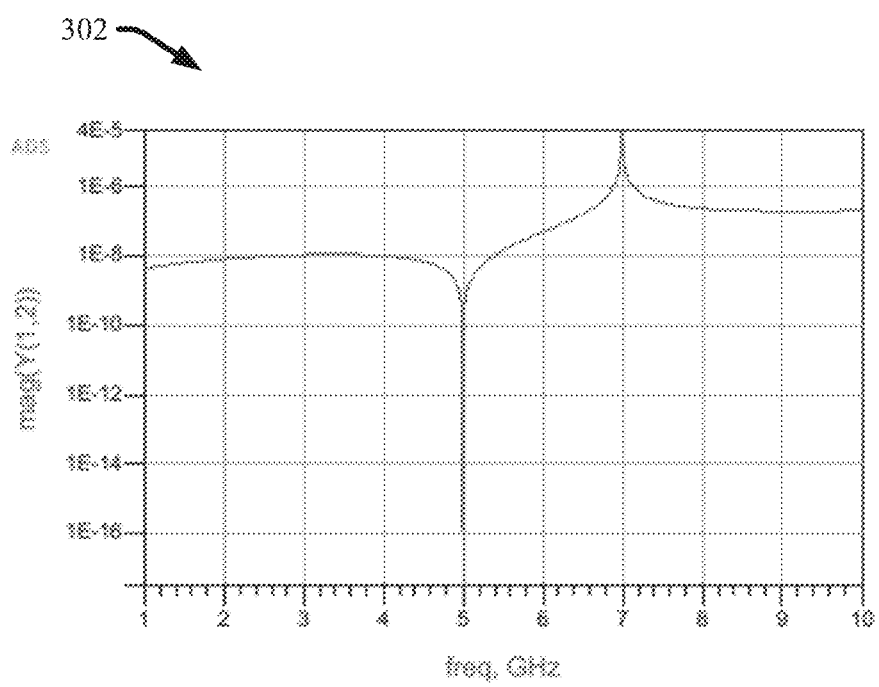

FIGS. 3A-3B illustrates diagrams of example, non-limiting graphs 300, 302 that can demonstrate how the qubit coupling structure 100 exemplified in the topology of FIG. 1 and/or the first microwave circuit 200 of FIG. 2 can achieve a target zero qubit-qubit coupling frequency that enables strong qubit-resonator bus coupling in accordance with one or more embodiments described herein. Repetitive description of like elements employed in other embodiments described herein is omitted for sake of brevity. Graphs 300 and 302 can characterize the first microwave circuit 200, where the second TLIND 212 has Z value (e.g., a ratio of the complex voltage of a give wave to the complex current of the same wave) of 50 ohms and a delay value of 0.35/7 nanoseconds (nsec). Additionally, the scattering parameters can include a start at 1.0 gigahertz (GHz), a stop at 10 GHz, and a step of 0.01 GHz.

Graph 300 characterizes the first microwave circuit 200 without the first TLIND 210, and graph 302 characterizes the first microwave circuit 200 shown in FIG. 2 (e.g., comprising a first TLIND 210 with a Z value of 50 ohms and a delay value of 0.15/7 nsec). As shown in graph 300, the zero qubit-qubit coupling frequency can be at 5 GHz, where the qubit-resonator bus coupling frequency can be at 10 GHz. As shown in graph 302, the added electrical distance provided by the first TLIND 210 can move the qubit-resonator bus coupling frequency to 7 GHz.

Figure 4:
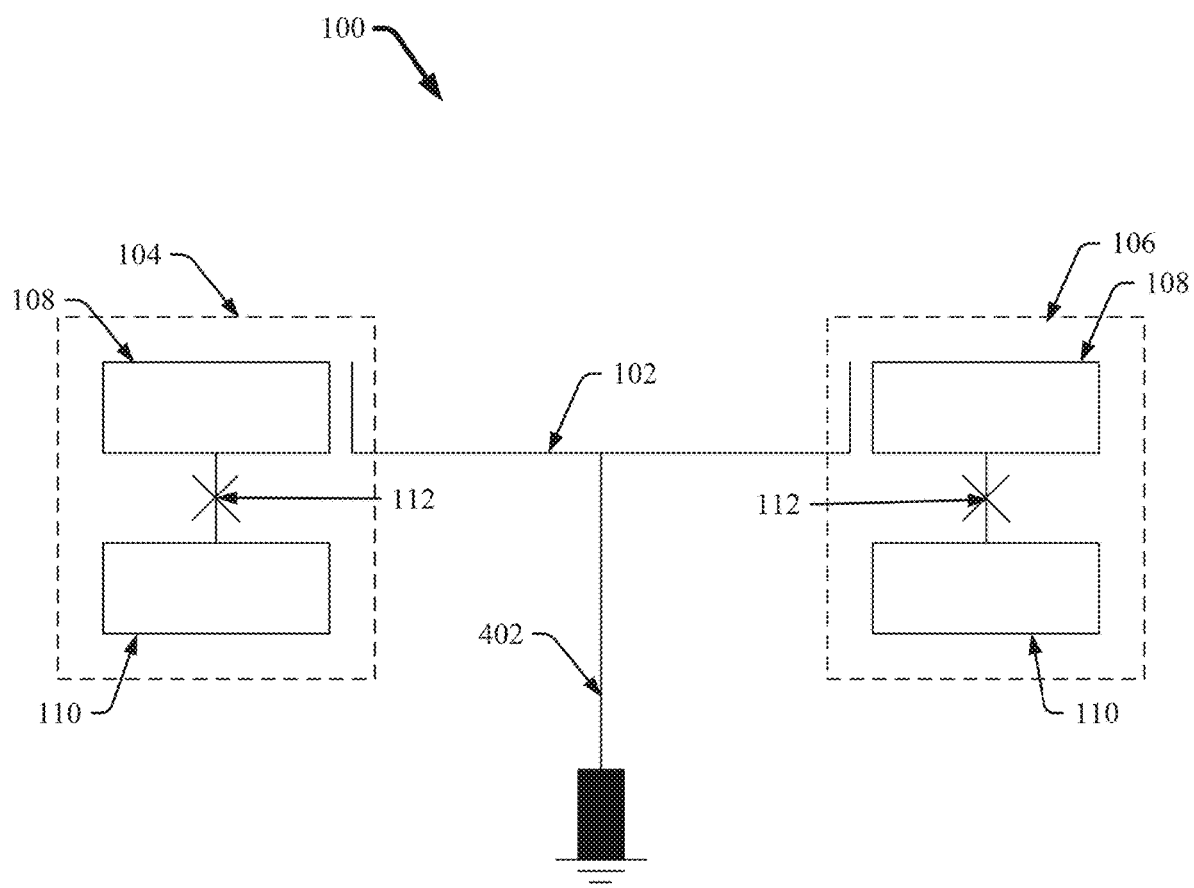
FIG. 4 illustrates a diagram of an example, non-limiting second resonator bus topology for enabling a RIP gate between a first qubit and a second qubit in accordance with one or more embodiments described herein.

FIG. 4 illustrates a diagram of an example, non-limiting second topology of the qubit coupling structure 100 in accordance with one or more embodiments described herein. Repetitive description of like elements employed in other embodiments described herein is omitted for sake of brevity. In one or more embodiments, the qubit coupling structure 100 can comprise multiple coupling pathways, thereby achieving a degenerate multimode resonator. For example, the χ of each respective coupling pathways can be large, but the J value can be zero, as characterized by Equation 6 below.

$$J = \sum_i \frac{g_{0,i} g_{1,i}}{2} \left( \frac{1}{f_0 - f_{BUS,i}} + \frac{1}{f_1 - f_{BUS,i}} \right) \tag{6}$$

Where "f" is the frequency of the resonator bus 102 ("BUS") and/or respective first qubit 104 and second qubit 106 (e.g., "i=0,1"). Thereby, the plurality of resonance modes of the qubit coupling structure 100 can collectively suppress qubit-qubit coupling between the first qubit 104 and the second qubit 106. To operate a RIP gate, the qubit coupling structure 100 (e.g., the resonator bus 102) can be driven at one of the resonance modes to lift the resonance mode sum. For instance, in one or more embodiments, the g values associated with the first qubit 104 and the second qubit 106 can be equal, and the multiple coupling pathways can establish a first χ value above the qubit frequency (e.g., a positive χ) and a second χ value below the qubit frequency (e.g., a negative χ). Thus, the qubit coupling structure 100 can comprise multiple coupling pathways to achieve multiple resonance modes that collectively suppress qubit-qubit coupling, where one or more of the resonance modes can be energized to drive a RIP gate.

For example, in one or more embodiments the resonator bus 102 can be a quarter wavelength superconducting coplanar waveguide (e.g., a λ/4 resonator) with multiple impedances. Additionally, the qubit coupling structure 100 can include a superconducting transmission line shunt 402. In one or more embodiments, the shunt 402 can be a superconducting ground connection coupled to the resonator bus 102 (e.g., a λ/4 resonator). In various embodiments, the qubit coupling structure 100 can achieve multiple coupling pathways due to at least the shunt 402, and the resonance modes of the multiple coupling pathways can interfere with each other. For example, the multiple resonance modes exhibited by the multiple coupling pathways can substantially cancel each other.

Figure 5:
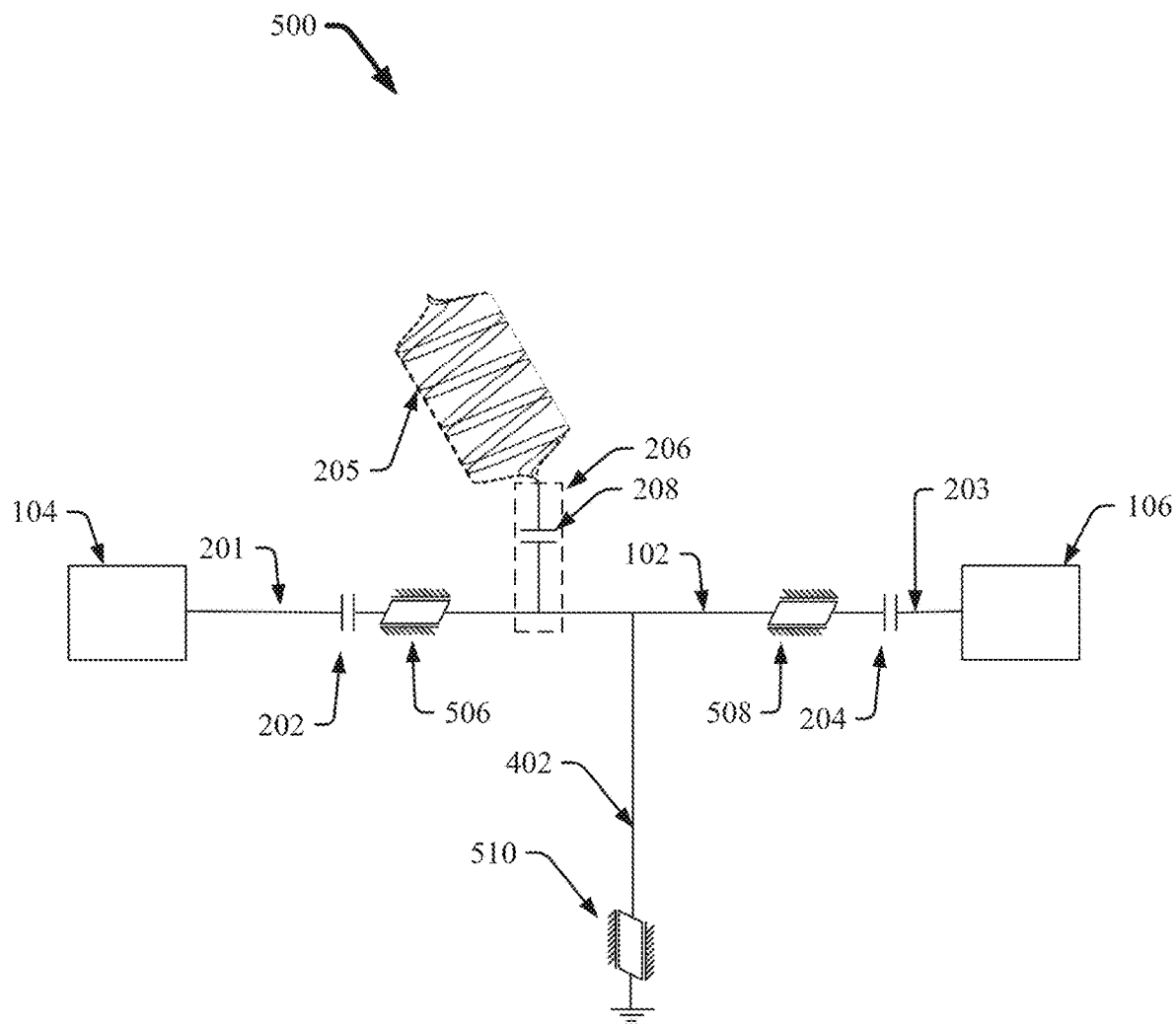
FIG. 5 illustrates a diagram of an example, non-limiting second microwave circuit that can exemplify the second resonator bus topology in accordance with one or more embodiments described herein.

FIG. 5 illustrates a diagram of an example, non-limiting second microwave circuit 500 that can exemplify the second topology shown in FIG. 4 of the qubit coupling structure 100 in accordance with one or more embodiments described herein. Repetitive description of like elements employed in other embodiments described herein is omitted for sake of brevity. As shown in FIG. 5, the first qubit 104 can be coupled to the resonator bus 102 (e.g., a λ/4 resonator) via the first coupling line 201 and/or first capacitor 202. Also, the second qubit 106 can be coupled to the resonator bus 102 (e.g., a λ/4 resonator) via the second coupling line 203 and/or second capacitor 204. Additionally, the exemplary second microwave circuit 500 can include a driving port 206, as described in various embodiments herein.

The resonator bus 102 can include a first co-planar waveguide element 506 and a second co-planar waveguide element 508. Additionally, the shunt 402 can include a third co-planar waveguide element 510. In various embodiments, the first co-planar waveguide element 506 and the second co-planar waveguide element 508 can have a first length ("L1"). Further, the third co-planar waveguide element 510 can have a second length ("L2"), which can be different than L1. For instance, L2 can be less than L1.

Figure 6A:
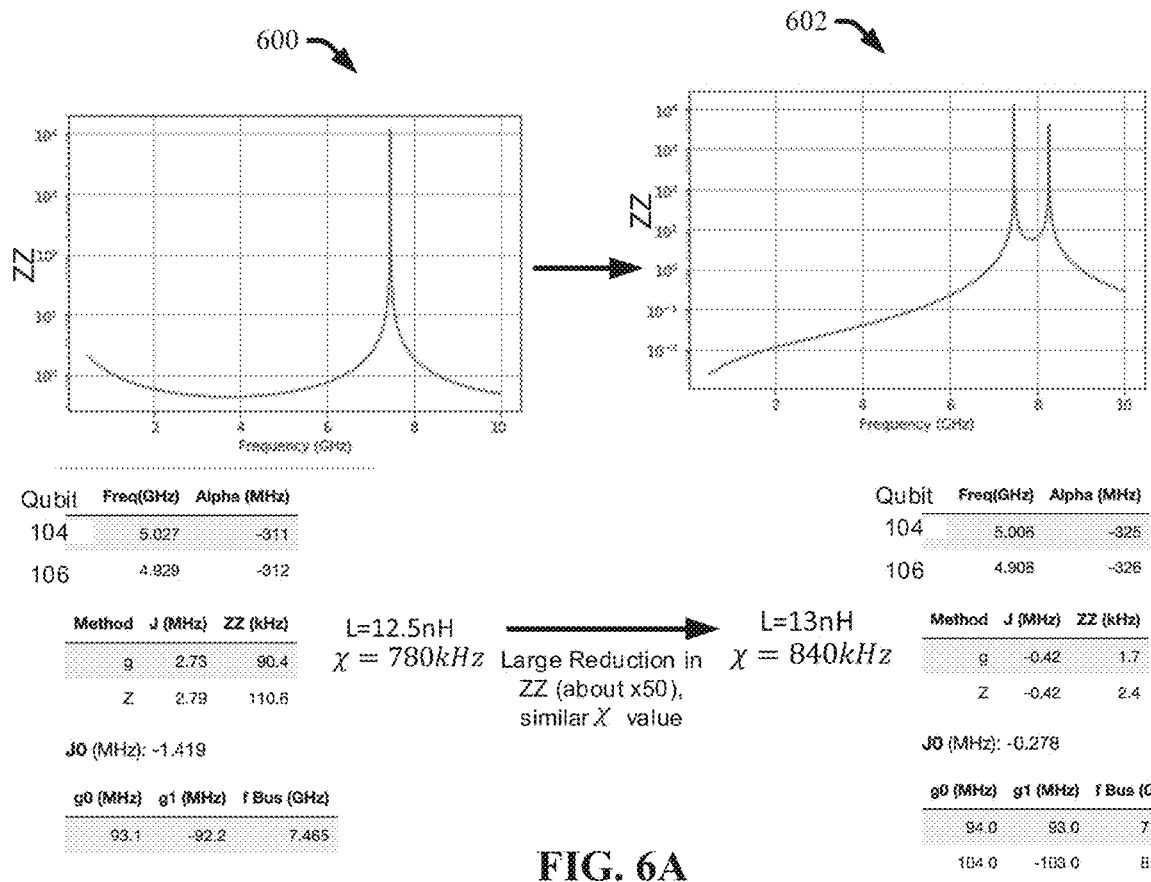
FIGS. 6A-6B illustrates diagrams, of example, non-limiting graphs that can depict a change in qubit-qubit coupling that can be achieved by the second microwave circuit in accordance with one or more embodiments described herein.
Figure 6B:
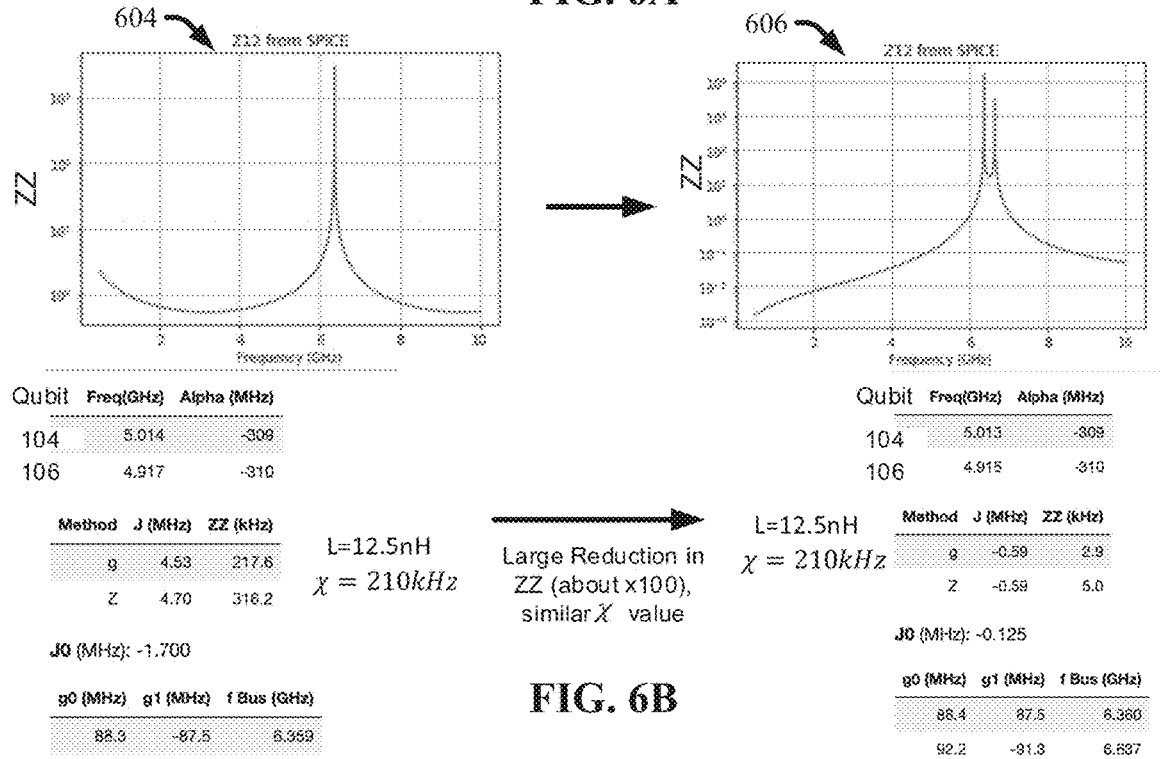

FIGS. 6A-6B illustrates diagrams of example, non-limiting graphs that can demonstrate how the qubit coupling structure 100 exemplified in the topology of FIG. 4 and/or the second microwave circuit 500 of FIG. 5 can achieve multiple interfering resonance modes in accordance with one or more embodiments described herein. Repetitive description of like elements employed in other embodiments described herein is omitted for sake of brevity.

Regarding FIG. 6A, graph 600 can characterize the second microwave circuit 500 absent shunt 402, where L1 equals 4 millimeters (mm). Graph 602 can characterize the second microwave circuit 500, shunt 402 included, where L1 equals 3.6 mm and L2 equals 0.2 mm. Other than the absence/presence of the shunt 402 and the corresponding L1/L2 lengths, the circuit conditions remained consistent between graph 600 and 602. As shown in graph 600, without the shunt 402, the coupling structure can exhibit a single resonance mode. As shown in graph 602, the incorporation of the shunt 402, and thereby multiple coupling pathways, can enable the qubit coupling structure 100 to exhibit multimode resonance. Additionally, the microwave circuit without the shunt 402, and the second microwave circuit 500 can exhibit similar self-inductance (e.g., 12.5 nanoHenry (nH) compared to 13 nH) and $\chi$ values while reducing the ZZ value.

Regarding FIG. 6B, graph 604 can characterize the second microwave circuit 500 absent shunt 402, where L1 equals 4.7 mm. Graph 606 can characterize the second microwave circuit 500, shunt 402 included, where L1 equals 4.5 mm and L2 equals 0.1 mm. Other than the absence/presence of the shunt 402 and the corresponding L1/L2 lengths, the circuit conditions remained consistent between graph 604 and 606. As shown in graph 606, without the shunt 402, the coupling structure can exhibit a single resonance mode. As shown in graph 606, the incorporation of the shunt 402, and thereby multiple coupling pathways, can enable the qubit coupling structure 100 to exhibit multimode resonance. Additionally, the microwave circuit without the shunt 402, and the second microwave circuit 500 can exhibit equivalent self-inductance (e.g., 12.5 nH) and $\chi$ values while reducing the ZZ value.

Figure 7:
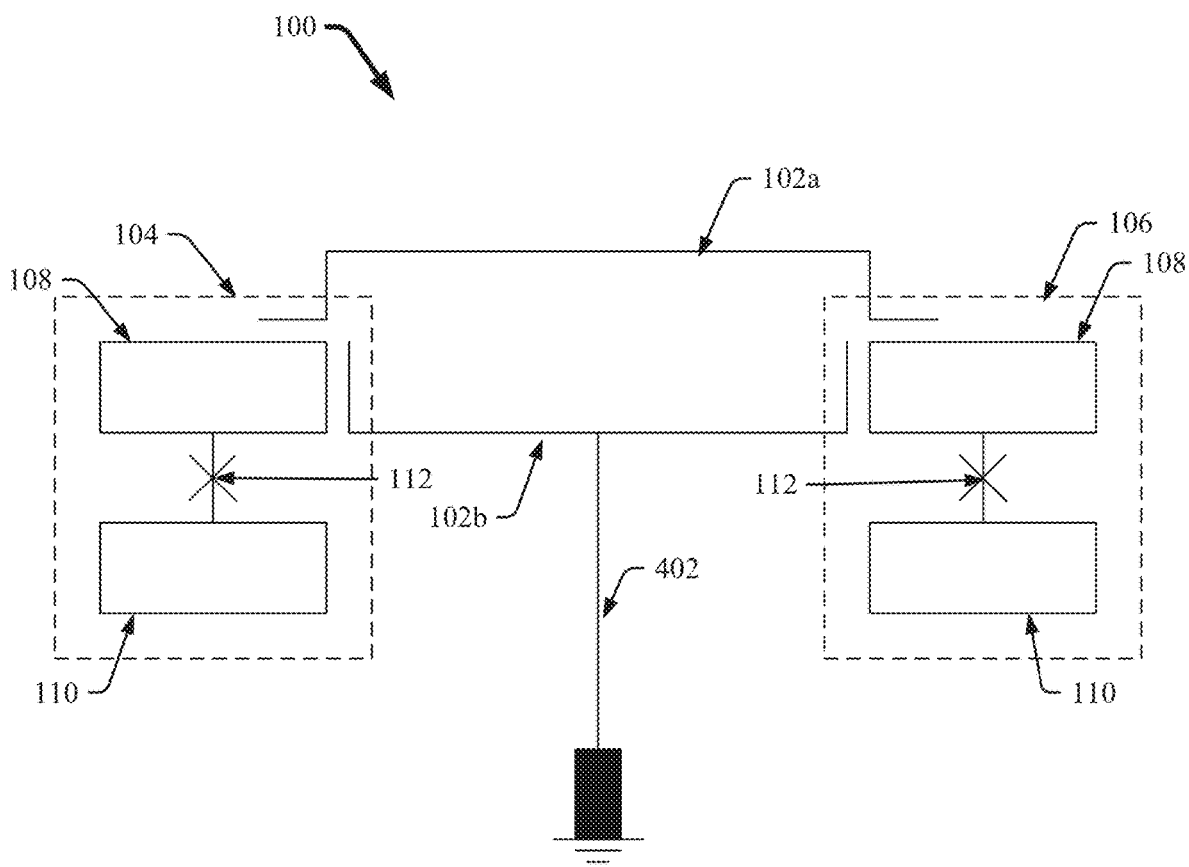
FIG. 7 illustrates a diagram of an example, non-limiting third resonator bus topology for enabling a RIP gate between a first qubit and a second qubit in accordance with one or more embodiments described herein.

FIG. 7 illustrates a diagram of an example, non-limiting third topology of the qubit coupling structure 100 in accordance with one or more embodiments described herein. Repetitive description of like elements employed in other embodiments described herein is omitted for sake of brevity. In one or more embodiments, various features of the first topology shown in FIG. 1 and the second topology shown in FIG. 4 can be combined. For example, the qubit coupling structure 100 can include multiple embodiments of the resonator bus 102 described herein. For instance, the qubit coupling structure 100 can include a first resonator bus 102a and a second resonator bus 102b capacitively coupled to the first capacitive pad 108 of the first qubit 104 and the first capacitive pad 108 of the second qubit 106.

In various embodiments, the first resonator bus 102a of the third topology of the qubit coupling structure 100 (e.g., shown in FIG. 7) can be a $\lambda/2$ resonator. In accordance with the various embodiments described herein, a relationship between the zero qubit-qubit coupling frequency and the resonance frequency of the first resonator bus 102a (e.g., a $\lambda/2$ resonator) can depend on the electrical distance of the respective qubits along the first resonator bus 102a. Further, the second resonator bus 102b of the third topology of the qubit coupling structure 100 (e.g. shown in FIG. 7) can be a $\lambda/4$ resonator coupled to shunt 402 (e.g., a superconducting ground connection). In accordance with the various embodiments described herein, the L1 and L2 lengths of the second resonator bus 102b and shunt 402 can further influence the development of multiple, interfering resonance modes exhibited by the qubit coupling structure 100.

Figure 8:
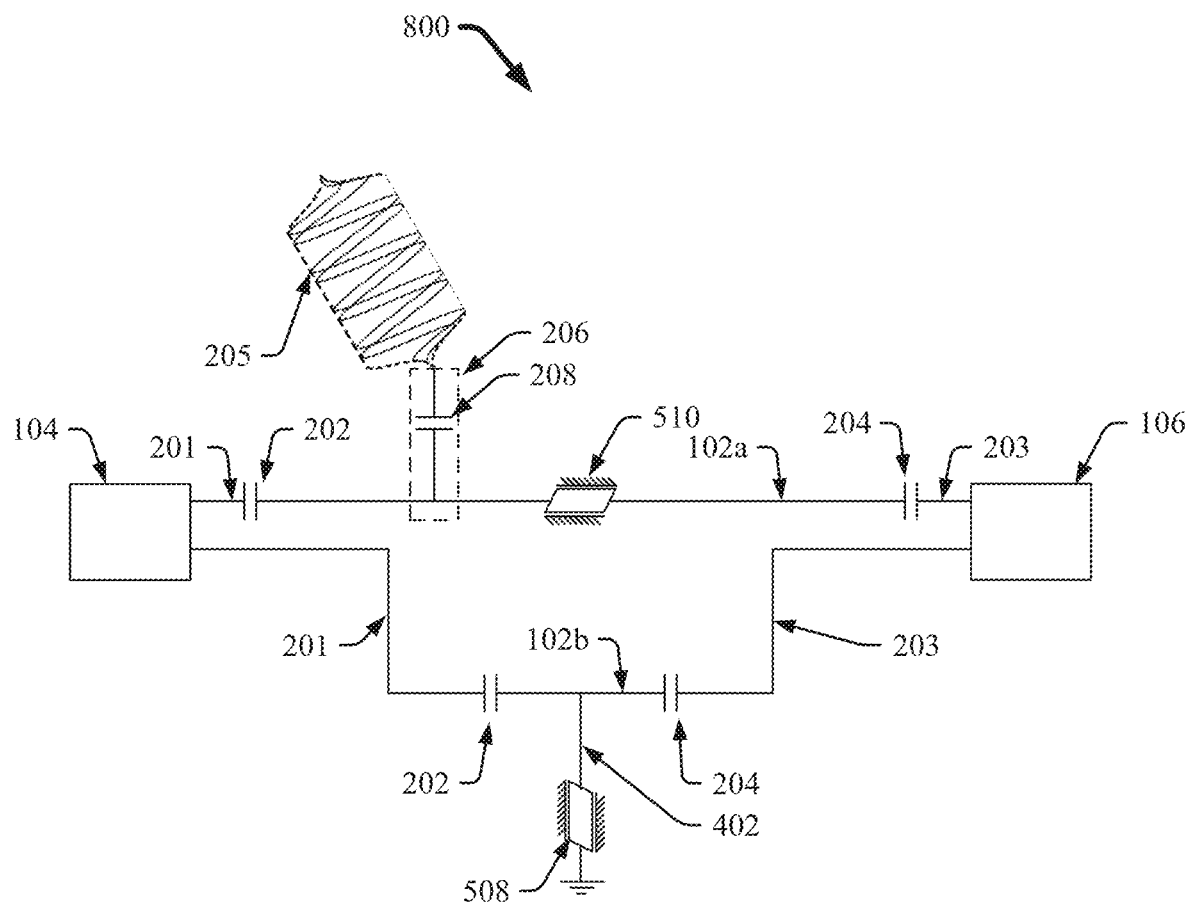
FIG. 8 illustrates a diagram of an example, non-limiting third microwave circuit that can exemplify the third resonator bus topology in accordance with one or more embodiments described herein.

FIG. 8 illustrates a diagram of an example, non-limiting third microwave circuit 800 that can exemplify the third topology shown in FIG. 7 of the qubit coupling structure 100 in accordance with one or more embodiments described herein. Repetitive description of like elements employed in other embodiments described herein is omitted for sake of brevity. In various embodiments, a drive port 206 can be coupled to the first resonator bus 102a and/or the second resonator bus 102b to drive a RIP gate across the qubit coupling structure 100 of the exemplary microwave circuit 800.

As shown in FIG. 8, a first resonator bus 102a can be coupled to the first qubit 104 via one or more first coupling lines 201 and/or first capacitors 202, and a second resonator bus 102b can be coupled to the second qubit 106 via one or more second coupling lines 203 and/or second capacitors 204. The first resonator bus 102a can be a $\lambda/2$ resonator with a co-planar waveguide (e.g., a third co-planar waveguide element 510). The second resonator bus 102b can be a $\lambda/4$ resonator coupled to a superconducting ground connection, and/or can include another co-planar waveguide (e.g., a second co-planar waveguide element 508). In various embodiments, the co-planar waveguide of the first resonator bus 102a can have a greater length than the co-planar waveguide of the second resonator bus 102b (e.g., the third co-planar waveguide element 510 of the first resonator bus 102a can have a length L3 that is greater than a length L2 the second co-planar waveguide element 508 of the second resonator bus 102b in accordance with various embodiments described herein). For example, the first resonator bus 102a can include a co-planar waveguide with a length of 10 mm, and the second resonator bus 102b can include a co-planar waveguide with a length of 4.5 mm.

Figure 9:
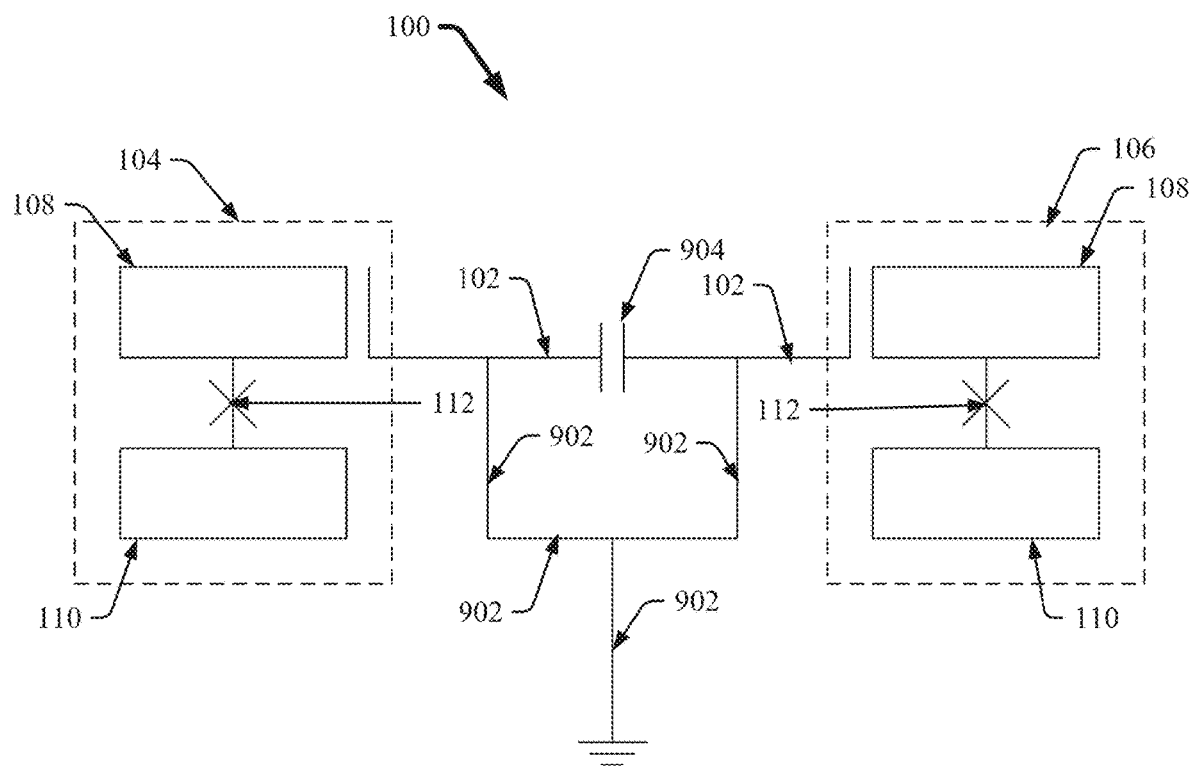
FIG. 9 illustrates a diagram of an example, non-limiting fourth resonator bus topology for enabling a RIP gate between a first qubit and a second qubit in accordance with one or more embodiments described herein.

FIG. 9 illustrates a diagram of an example, non-limiting fourth topology of the qubit coupling structure 100 in accordance with one or more embodiments described herein. Repetitive description of like elements employed in other embodiments described herein is omitted for sake of brevity. In one or more embodiments, the qubit coupling structure 100 can include a coupling stub 902 coupled to the resonator bus 102.

As shown in FIG. 9, the resonator bus 102 can include a fourth capacitor 904 that can define a first segment of the resonator bus 102 and a second segment of the resonator bus 102. The first segment can comprise a portion of the resonator bus 102 positioned between the first qubit 104 and the fourth capacitor 904. For example, the first segment can be capacitively coupled to the first qubit 104 and extend to the fourth capacitor 904. The second segment can comprise a portion of the resonator bus 102 positioned between the second qubit 106 and the fourth capacitor 904. For example, the second segment can be capacitively coupled to the second qubit 106 and extend to the fourth capacitor 904. In various embodiments, the resonator bus 102 can be a $\lambda/4$ resonator.

The coupling stub 902 can be coupled to the first segment and the second segment of the resonator bus 102. In various embodiments, the coupling stub 902 can be a $\lambda/4$ resonator. Further, in one or more embodiments the coupling stub 902 can be a circuit short (e.g., as shown in FIG. 9 by short connection 906). In one or more embodiments, the coupling stub 902 can be a superconducting ground connection.

Figure 10:
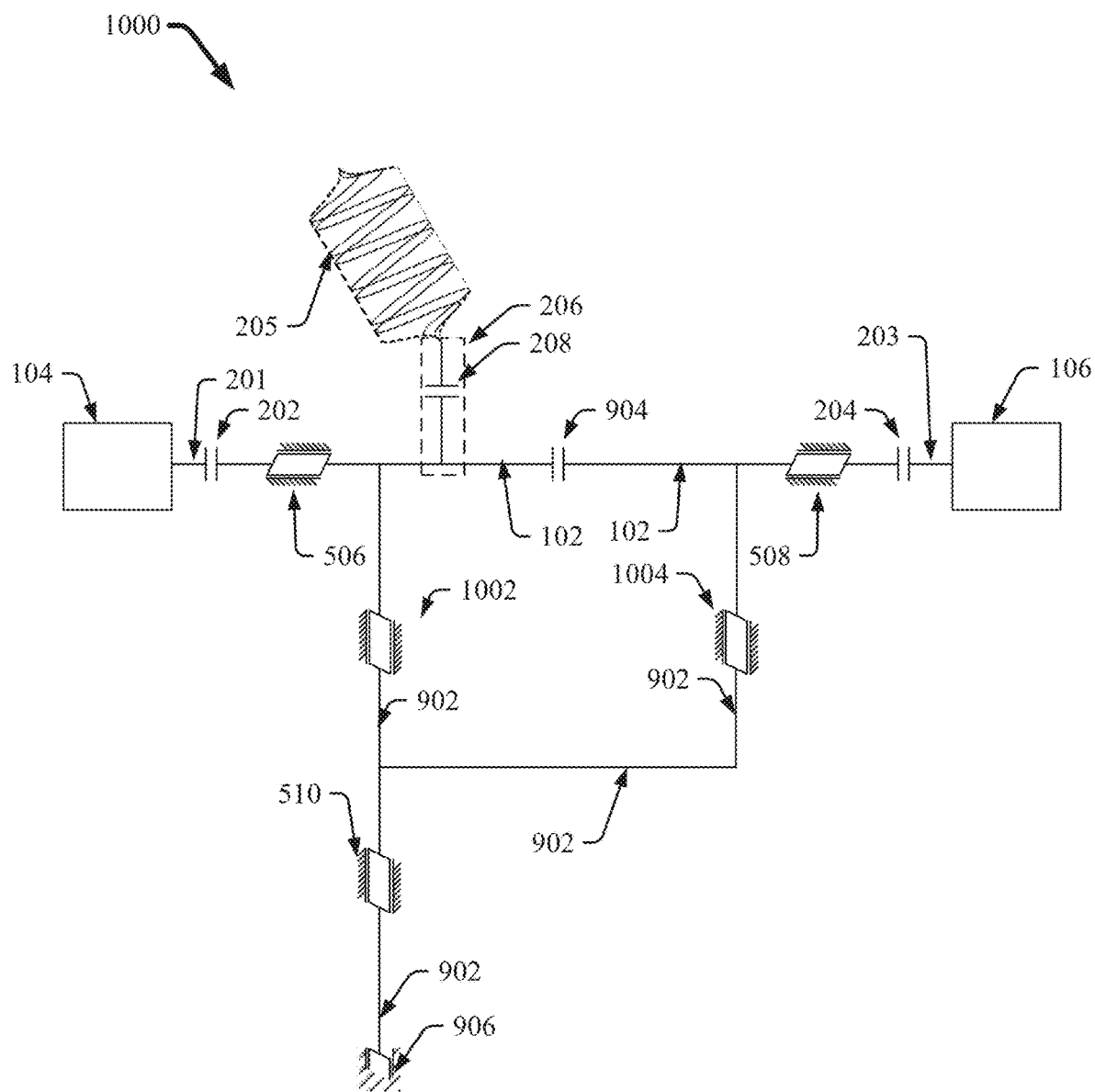
FIG. 10 illustrates a diagram of an example, non-limiting fourth microwave circuit that can exemplify the first resonator bus topology in accordance with one or more embodiments described herein.

FIG. 10 illustrates a diagram of an example, non-limiting fourth microwave circuit 1000 that can exemplify the fourth topology shown in FIG. 9 of the qubit coupling structure 100 in accordance with one or more embodiments described herein. Repetitive description of like elements employed in other embodiments described herein is omitted for sake of brevity. As shown in FIG. 10, the first qubit 104 can be coupled to the resonator bus 102 (e.g., a $\lambda/4$ resonator) via the first coupling line 201 and/or first capacitor 202. Also, the second qubit 106 can be coupled to the resonator bus 102 (e.g., a $\lambda/4$ resonator) via the second coupling line 203 and/or second capacitor 204. Additionally, the exemplary second microwave circuit 500 can include a driving port 206, as described in various embodiments herein.

Further, the fourth capacitor 904 can be positioned along the resonator bus 102 between the first capacitor 202 and the second capacitor 204, thereby defining a first segment of the resonator bus 102 (e.g., coupled to the first qubit 104) and a second segment of the resonator bus 102 (e.g., coupled to the second qubit 106). The first segment of the resonator bus 102 can include first co-planar waveguide element 506, and the second segment of the resonator bus 102 can include second co-planar waveguide element 508. In accordance with the various embodiments described herein, the first co-planar waveguide element 506 of the first segment and the second co-planar waveguide element 508 of the second segment can have the same length L1.

In various embodiments, the coupling stub 902 can include a fourth co-planar waveguide element 1002 coupled to the first segment and a fifth co-planar waveguide element 1004 coupled to the second segment. Further, the fourth co-planar waveguide element 1002 and/or the fifth co-planar waveguide element 1004 can be coupled to the third co-planar waveguide element 510 (e.g., which has a different length of L2). Additionally, the fourth co-planar waveguide element 1002 and/or the fifth co-planar waveguide element 1004 can have the same length ("L3"). In one or more embodiments, L3 can be greater than L1 and L2. For example, the length of the co-planar waveguides can be characterized by: L3>L1>L2.

Figure 11:
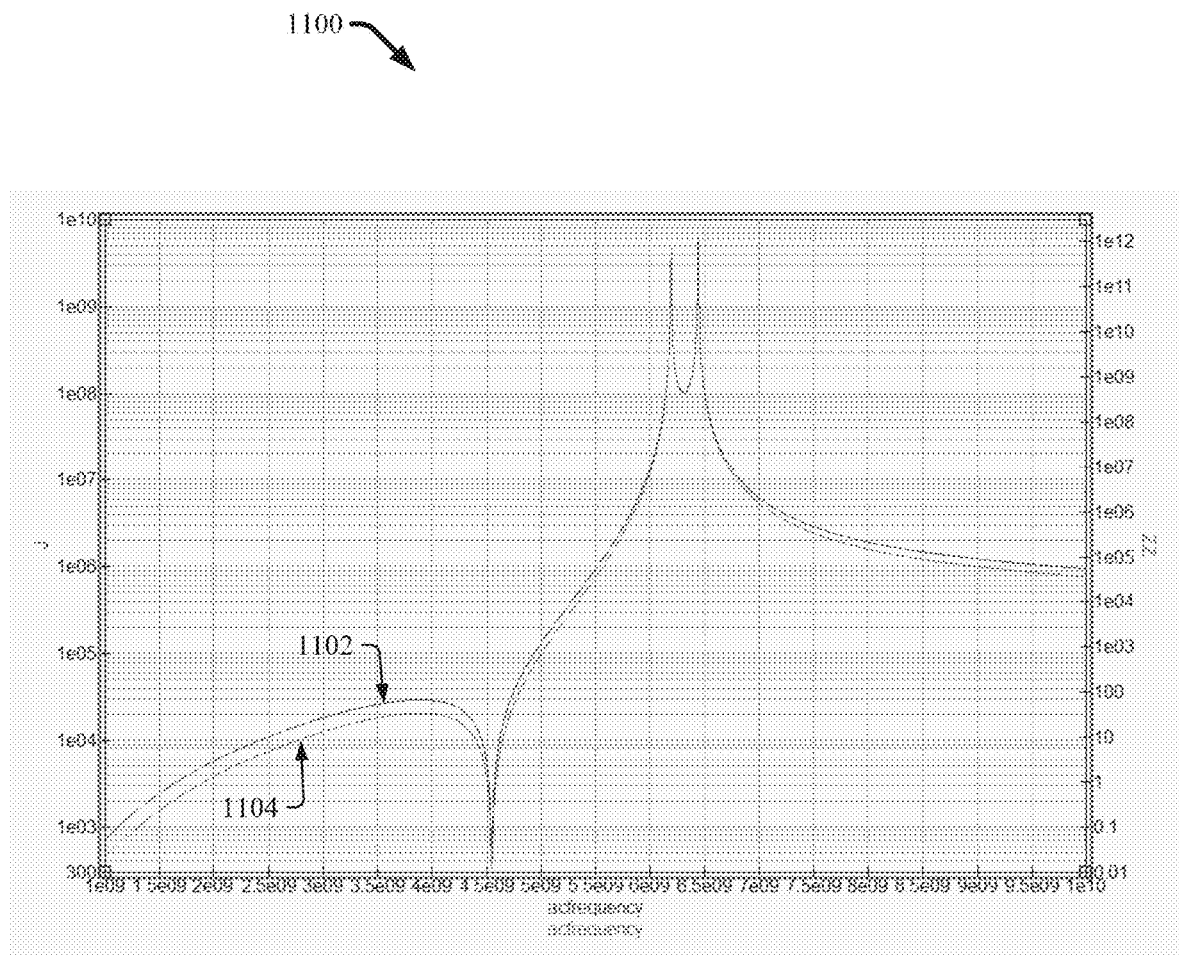
FIG. 11 illustrates a diagram, of example, non-limiting graph that can depict a change in qubit-qubit coupling that can be achieved by the fourth microwave circuit in accordance with one or more embodiments described herein.

FIG. 11 illustrates a diagram of example, non-limiting graph 1100 that can demonstrate how the qubit coupling structure 100 exemplified in the topology of FIG. 9 and/or the fourth microwave circuit 1000 of FIG. 10 can achieve multiple interfering resonance modes in accordance with one or more embodiments described herein. Repetitive description of like elements employed in other embodiments described herein is omitted for sake of brevity.

As described herein, the fourth qubit coupling structure 100 topology exemplified in FIGS. 9 and 10 can achieve a generate multimode resonator. For example, the qubit coupling structure 100 can have multiple coupling pathways via the resonator bus 102 and/or the coupling stub 902. Further, each of the coupling pathways can exhibit a resonance mode that can interfere with each other. For example, the even and odd resonance modes of the qubit coupling structure 100 shown in FIGS. 9-10 (e.g., a degenerate multimode resonator) can add to substantially cancel a coupling interaction between the first qubit 104 and the second qubit 106 via the fourth capacitor 904. Further, the short coupling stub 902 can cause (e.g., via combination of the third co-planar waveguide element 510, fourth co-planar waveguide element 1002, and/or fourth co-planar waveguide element 1004) the even resonance modes of the qubit coupling structure 100 to have a different shape than the odd resonance modes, thereby giving a zero qubit-qubit coupling at the qubit frequency.

For example, graph 1100 characterizes the exemplary fourth microwave circuit 1000. Line 1102 can characterize the J value, and line 1104 can characterize the ZZ value. As shown in graph 1100, the qubit coupling structure 100 exhibits two degenerate resonance modes at about 6.2 GHz and 6.5 GHz, split by about 300 megahertz (MHz). Also, shown in graph 1100, the zero qubit-qubit coupling frequency for the exemplary fourth microwave circuit 1000 can be established at about 4.5 GHz. In various embodiments, the ZZ value can be inferred from the J value by assuming a 50 MHz delta between the first qubit 104 and the second qubit 106.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a coupling structure coupled to a first qubit and a second qubit, the coupling structure having a plurality of coupling pathways configured to selectively produce multiple resonance modes, wherein at least one of the multiple resonance modes induces coupling of the first qubit to the second qubit to enable a resonator induced phase gate operation, wherein a group of other resonance modes of the multiple resonance modes inhibit coupling of the first qubit to the second qubit when the resonator induced phase gate operation is not enabled, wherein a coupling pathway from the plurality of coupling pathways is a resonator, wherein the first qubit is coupled to a first end of the resonator, and wherein the second qubit is coupled to a defined point along a length of the resonator selected to bring a qubit-qubit coupling frequency of the first qubit and the second qubit to a defined frequency difference from a resonance frequency of the resonator.

2. The apparatus of claim 1, wherein the coupling pathway establishes the resonator induced phase gate operation.

3. The apparatus of claim 1, wherein a group of the plurality of coupling pathways collectively suppress a coupling interaction between the first qubit and the second qubit.

4. The apparatus of claim 1, wherein the first qubit and the second qubit are coupled to the resonator via at least one coupling technology selected from the group consisting of capacitive coupling and inductive coupling.

5. The apparatus of claim 1, wherein the coupling structure further comprises a driving port.

6. An apparatus, comprising:
a coupling structure coupled to a first qubit and a second qubit, the coupling structure having a plurality of coupling pathways configured to selectively produce multiple resonance modes, wherein at least one of the multiple resonance modes induces coupling of the first qubit to the second qubit to establish a resonator induced phase gate operation, wherein a group of other resonance modes of the multiple resonance modes inhibit coupling of the first qubit to the second qubit when the resonator induced phase gate operation is not enabled, and wherein a coupling pathway from the plurality of coupling pathways is a resonator with a transmission line shunt.

7. The apparatus of claim 6, wherein the coupling pathway establishes the resonator induced phase gate operation.

8. The apparatus of claim 7, wherein a group of the plurality of coupling pathways collectively suppress a coupling interaction between the first qubit and the second qubit.

9. The apparatus of claim 6, wherein a circuit shunt is a section of the transmission line shunt with a superconducting ground connection.

10. The apparatus of claim 6, wherein the coupling structure further comprises a driving port.

11. An apparatus, comprising:
a coupling structure coupled to a first qubit and a second qubit, the coupling structure having a plurality of coupling pathways configured to selectively produce multiple resonance modes, wherein at least one of the multiple resonance modes induces coupling of the first qubit to the second qubit to enable a resonator induced phase gate operation, wherein a group of other resonance modes of the multiple resonance modes inhibit coupling of the first qubit to the second qubit when the resonator induced phase gate operation is not enabled, and wherein a coupling pathway from the plurality of coupling pathways comprise a quarter wavelength superconducting waveguide capacitively coupled to the first qubit and the second qubit, wherein the quarter wavelength superconducting waveguide has multiple impedances.

12. The apparatus of claim 11, wherein a fundamental resonance of the quarter wavelength superconducting waveguide is below a frequency of the first qubit and a frequency of the second qubit.

13. The apparatus of claim 11, wherein the plurality of coupling pathways further comprise a half wavelength superconducting waveguide capacitively coupled to the first qubit and the second qubit.

14. The apparatus of claim 11, wherein even modes of the group of other resonance modes add to odd modes of the group of other resonance modes to inhibit the coupling of the first qubit to the second qubit.

15. An apparatus, comprising:
a coupling structure coupled to a first qubit and a second qubit, the coupling structure having a plurality of coupling pathways configured to selectively produce multiple resonance modes, wherein at least one of the multiple resonance modes induces coupling of the first qubit to the second qubit to enable a resonator induced phase gate operation, wherein a group of other resonance modes of the multiple resonance modes inhibit coupling of the first qubit to the second qubit when the resonator induced phase gate operation is not enabled, and wherein a coupling pathway from the plurality of coupling pathways comprise:
a quarter wavelength superconducting waveguide capacitively coupled to the first qubit and the second qubit, wherein the quarter wavelength superconducting waveguide has multiple impedances; and
a half wavelength superconducting waveguide capacitively coupled to the first qubit and the second qubit.

16. The apparatus of claim 15, further comprising:
a superconducting ground connection that is coupled to, and electrically grounds, the quarter wavelength superconducting waveguide.

17. The apparatus of claim 16, wherein the quarter wavelength superconducting waveguide and the half wavelength superconducting waveguide are both coupled to a first capacitive pad of the first qubit and a first capacitive pad of the second qubit.

18. The apparatus of claim 15, wherein even modes of the group of other resonance modes add to odd modes of the group of other resonance modes to inhibit the coupling of the first qubit to the second qubit.

19. The apparatus of claim 15, further comprising:
a drive port coupled to one of the plurality of coupling pathways that drives the resonator-induced phase gate operation.

20. The apparatus of claim 15, further comprising:
a coupling stub coupled to one of the plurality of coupling pathways.

21. An apparatus, comprising:
a coupling structure coupled to a first qubit and a second qubit, the coupling structure having a plurality of coupling pathways configured to selectively produce multiple resonance modes, wherein at least one of the multiple resonance modes induces coupling of the first qubit to the second qubit to enable a resonator induced phase gate operation, wherein a group of other resonance modes of the multiple resonance modes inhibit coupling of the first qubit to the second qubit when the resonator induced phase gate operation is not enabled, and wherein a coupling pathway from the plurality of coupling pathways comprise:

a quarter wavelength superconducting waveguide capacitively coupled to the first qubit and the second qubit, wherein the quarter wavelength superconducting waveguide has multiple impedances; and a direct capacitive coupling between the first qubit and the second qubit.

22. The apparatus of claim 21, wherein the quarter wavelength superconducting waveguide has a first segment between the first qubit and a capacitor and a second segment between the capacitor and the second qubit, and wherein the apparatus further comprising a superconducting ground connection that is coupled to, and electrically grounds, the first segment.

23. The apparatus of claim 21, wherein the the group of resonator modes add to cancel a coupling interaction between the first qubit and the second qubit.

24. The apparatus of claim 21, wherein the plurality of coupling pathways further comprise a half wavelength superconducting waveguide capacitively coupled to the first qubit and the second qubit.

25. The apparatus of claim 21, wherein even modes of the group of other resonance modes add to odd modes of the group of other resonance modes to inhibit the coupling of the first qubit to the second qubit.

* * * * *